(No Model.)
C. WIEBUSH.
COMBINED MOP AND WINDOW CLEANER.
No. 503,888. Patented Aug. 22, 1893.
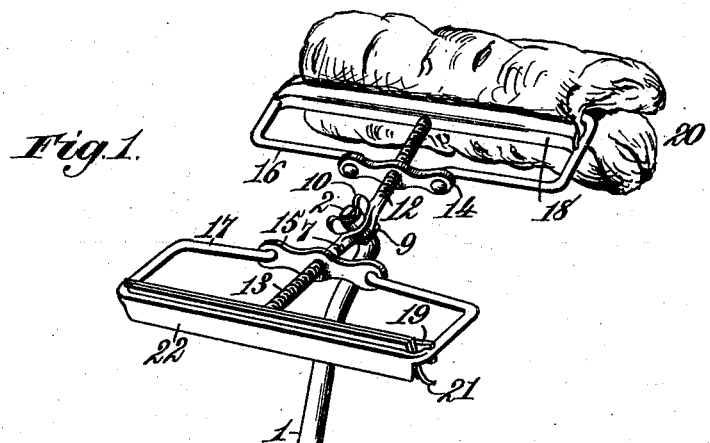
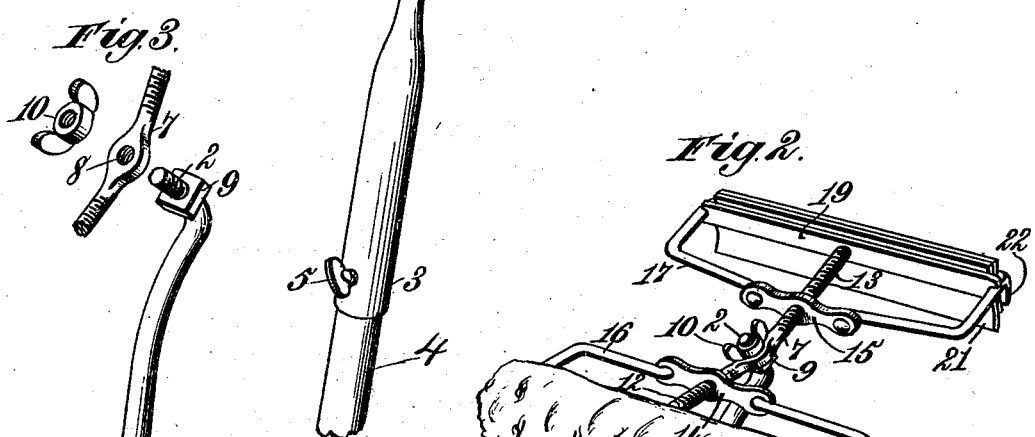
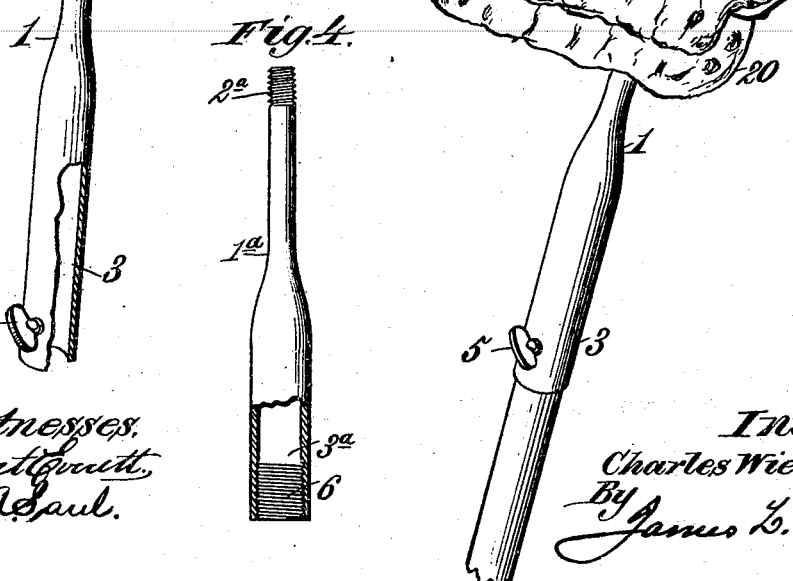
Witnesses,
Robert Garrett,
J. A. Paul.
Inventor:
Charles Wiebush.
By James L. Norris.
Atty.

UNITED STATES PATENT OFFICE.

CHARLES WIEBUSH, OF WACO, TEXAS, ASSIGNOR OF ONE-HALF TO RICHARD W. PENMAN, OF SAME PLACE.

COMBINED MOP AND WINDOW-CLEANER.

SPECIFICATION forming part of Letters Patent No. 503,888, dated August 22, 1893.

Application filed June 1, 1893. Serial No. 476,213. (No model.)

*To all whom it may concern:*

Be it known that I, CHARLES WIEBUSH, a citizen of the United States, residing at Waco, in the county of McLennan and State of Texas, have invented new and useful Improvements in a Combined Mop and Rubber or Brush Holder, of which the following is a specification.

This invention has for its object to provide a new and improved mop and rubber holder particularly designed for cleaning windows, but useful for cleaning walls and other purposes, and which is susceptible of rotary adjustment to place either the mop or the rubber in operative position at the end of the handle.

To accomplish this object my invention consists in the features of construction and the combination or arrangement of parts hereinafter described and claimed, reference being made to the accompanying drawings, in which—

Figure 1 is a perspective view of the device, showing the mop clamped in position for use. Fig. 2 is a similar view, showing the rubber clamped in position for use. Fig. 3 is a broken perspective view, showing the head of the handle on which the rotable holder or duplex clamp is mounted; and Fig. 4 is a detail view, showing a modified construction of handle for connecting with a pole.

In order to enable those skilled in the art to make and use my invention, I will now describe the same in detail, referring to the drawings, wherein—

The numeral 1 indicates a metallic handle, having at one end a head 2, and at the opposite end a socket 3, adapted to connect with the pole 4 of any desired length. The pole is preferably connected with the handle by inserting one end into the socket 3, and rigidly connecting the parts by a set screw 5; but, as exhibited in Fig. 4, the socket 3ª of the handle 1ª is provided with an internal screw-thread 6 for engaging the end of the pole. As various connections between the pole and the handle may be adopted, I do not confine myself to either of the constructions shown for this purpose.

The head 2 of the handle is in the form of a screw-threaded stem projecting at an obtuse angle therefrom, and on this stem a holder composed of a metallic bar 7 is adapted to rotate in a circle, for which purpose the bar is provided centrally between its ends with a screw-threaded socket 8, engaging the screw-threaded stem, and adapted to bear against an adjustable nut 9 mounted on the stem. The outer end of the stem is provided with a clamping thumb-nut 10, for the purpose of rigidly securing the bar or holder 7 in a fixed position after it has been rotated to the desired position on the stem. The end portions of the bar or holder 7 are screw-threaded, as at 12 and 13, to engage screw nuts 14 and 15, to which are secured the ends of yokes 16 and 17, adapted to co-operate with cross bars 18 and 19, journaled centrally between their ends on the extremities of the bar or holder 7 for the purpose of securing a mop 20 and a rubber 21 in proper position for use in cleaning windows, walls, ceilings, and the like.

The mop 20 may be composed of a sponge or a cloth, or any other material suitable for mopping purposes, and the rubber may be composed of a strip of elastic material, such as india-rubber, or leather; and to secure the mop and the rubber in their respective clamps, the yokes 16 and 17, cross-bars 18 and 19, and nuts 14 and 15, are rotated so that the nuts are caused to traverse the screw-threaded portions 12 and 13 of the bar or holder 7, for the purpose of separating the yokes from the cross bars for the introduction of the mop and the rubber, after which the yokes, cross-bars, and nuts are rotated in the reverse direction for causing the yokes and the cross bars to clamp the mop and the rubber in fixed positions.

By mounting or journaling the bar or holder 7 at or near its center on the head of the handle, it is possible to rotate the bar or holder in a circle or circular path, for the purpose of placing either the mop clamp or the rubber clamp in position to project longitudinally from the handle for the purpose of mopping, or rubbing, as the case may require. The rotary adjustment of the bar or holder is effected by loosening the clamping screw 10 and turning the bar or holder in the arc of a circle on the head 2, after which the thumb-nut is tightened for the purpose of rigidly clamping the bar or holder in the fixed position to which adjusted.

I do not confine myself to a screw-threaded connection between the head 2 and the central portion of the bar or holder 7, as other constructions for this purpose may be employed, it only being essential that the bar or holder can rotate on the head for the purpose of placing either the mop clamp, or the rubber clamp in position for use. The clamp for rigidly securing the bar or handle in a fixed position after adjustment may be composed of devices other than the supporting nut 9 and the clamping nut 10, but these devices are preferred, in that they are simple and effective in practical operation. The devices constructed as described and claimed are designed to be used in connection with a flexible or elastic rubber, and a mop of some flexible material which can be saturated with water, such as a sponge, or a cloth; but, obviously, the duplex clamp or holder can be employed to hold any two objects, such as a mop and a brush.

The handle is constructed of metal, so that it can be made light and efficient, and be provided with a socket to receive a pole for cleaning windows, or other objects or places too elevated to reach without the pole. The device will be found useful for cleaning painted, plastered, or other walls, windows of high buildings, and for any other purpose for which it is adapted, or for which similar devices are employed.

The cross part of the yoke 17 is constructed in the form of a blade 22, one longitudinal edge of which projects sufficiently far that if the rubber 21 be detached, the blade can be used as a rigid scraper for removing mud and other hard substances which are not easily washed off. For cleaning cornices and similar angular objects, a bunch of broom straw, or any other suitable material can be inserted into one of the clamps and utilized for removing dust, and for cleaning purposes.

The device is well adapted for cleaning windows of high buildings, and for this purpose it is preferred to use the straight handle illustrated in Fig. 4, where the head $2^a$, formed of a screw-threaded portion or stem, is in line with the body of the handle, and is adapted to be screwed into the socket 8 of the bar or holder 7. A short staff or pole being inserted into the socket $3^a$ of the straight handle $1^a$, the operator can stand on the sill of a window, pull down the sash, and reach over the same for washing the window glass; or the operator can sit on the window sill, draw down the sash, and reach to the top of the window glass with convenience.

It will be obvious that various kinds of work can be accomplished by the employment of the device without the annoyance of scaffolding, and without the use of ladders.

For cleaning plaster or painted board walls, the sponge clamp can be adjusted at an angular position relatively to the handle, and thus be well adapted for working in the angles of the room.

Having thus described my invention, what I claim is—

1. The combination with a handle having a screw-threaded head, a duplex holder composed of a bar mounted intermediate its extremities on the screw-threaded stem to rotate in a circular path, and provided at opposite sides of said screw-threaded head with yokes and adjustable cross bars for clamping respectively a mop and a flexible rubber, and a clamping screw nut engaging the screw-threaded stem between said yokes and bearing against the rotatable bar for rigidly clamping the latter in a fixed position on the screw-threaded head of the handle, substantially as described.

2. The combination of a handle having at one end a head, a holder, consisting of a bar journaled intermediate its extremities to rotate in a circular path on the head, and provided with screw-threaded end portions, a nut engaged with each screw-threaded end of the bar, a cross-bar journaled to each outer end of the screw-threaded bar, a yoke loosely engaging each cross bar, and connected with one of the nuts, and means for rigidly securing the holder in a fixed position on the head of the handle, substantially as described.

3. The combination of a handle having at one end a screw-threaded stem, a bar journaled intermediate its extremities on the stem, adapted to rotate in a circular path, and provided with screw-threaded end portions, a clamping screw nut engaging the stem and bearing on the bar for rigidly securing the latter in a fixed position, a cross bar journaled to each end of the screw-threaded bar, a nut arranged on each screw-threaded portion of the bar, and a yoke loosely engaging each cross bar, and connected with one of the nuts on the screw-threaded bar, substantially as described.

In testimony whereof I have hereunto set my hand in presence of two subscribing witnesses.

CHARLES WIEBUSH.

Witnesses:
A. N. HARRISON,
J. A. GILES.